United States Patent [19]

Churchill et al.

[11] Patent Number: 5,267,157
[45] Date of Patent: Nov. 30, 1993

[54] TRANSMISSION START-UP CONTROL

[75] Inventors: Stephen J. Churchill, Essex, England; Bradley A. Nielsen, New Holland, Pa.; Scott A. Rempe, Pella, Iowa; James W. Macqueene, Willowbrook, Ill.

[73] Assignee: Ford New Holland, Inc., New Holland, Pa.

[21] Appl. No.: 709,629

[22] Filed: Jun. 3, 1991

[51] Int. Cl.$^5$ .................. G06F 15/50; B60K 41/04
[52] U.S. Cl. ................... 364/424.1; 74/866; 74/867; 192/0.096.0.052
[58] Field of Search ............. 364/424.1; 74/866, 861, 74/335, 867

[56] References Cited

U.S. PATENT DOCUMENTS

| | | | |
|---|---|---|---|
| 4,350,058 | 9/1982 | Miller et al. | 74/861 |
| 4,430,911 | 2/1984 | Morscheck | 74/861 |
| 4,648,040 | 3/1987 | Cornell et al. | 364/424.1 |
| 4,663,713 | 5/1987 | Cornell et al. | 364/424.1 |
| 4,663,714 | 5/1987 | Cornell et al. | 364/424.1 |
| 4,843,902 | 7/1989 | Patton et al. | 74/335 |
| 4,855,913 | 8/1989 | Brekkestran et al. | 364/424.1 |
| 4,874,070 | 10/1989 | Nellums et al. | 192/0.052 |
| 4,967,385 | 10/1990 | Brekkestran et al. | 364/424.1 |
| 4,989,470 | 2/1991 | Bulgrien | 364/424.1 |
| 4,989,471 | 2/1991 | Bulgrien | 74/336 R |
| 5,007,299 | 4/1991 | Bulgrien | 74/335 |
| 5,050,453 | 9/1991 | Yamaguchi | 74/858 |
| 5,105,675 | 4/1992 | Langford et al. | 364/424.1 |

*Primary Examiner*—Thomas G. Black
*Assistant Examiner*—Jacques H. Louis-Jacques
*Attorney, Agent, or Firm*—Griffin Butler Whisenhunt & Kurtossy

[57] ABSTRACT

A vehicle transmission system having shift lever control of synchronized couplers for selection of ranges of gears and electro-hydraulic powershift clutches for selection of a gear within the selected range is provided with controls for avoiding unexpected speeds or speed changes under certain conditions. On start-up, if the vehicle is stationary, a microprocessor automatically selects which powershift gear is effective, the selection being such that the start-up speed is as nearly uniform as possible within the limits imposed by the positions of the shift levers.

18 Claims, 8 Drawing Sheets

TRANSMISSION START-UP CONTROL

RELATED APPLICATIONS

This application discloses subject matter also disclosed and claimed in the following concurrently filed and commonly owned applications:

Application Ser. No. 07/709,187 entitled Transmission System with Single Lever Coupler and Powershift Control, now abandoned.

Application Ser. No. 07/710,360 entitled Transmission Speed Matching Control.

Application Ser. No. 07/709,188 entitled Creeper Gear Engagement/Disengagement, now U.S. Pat. No. 5,105,675.

Application Ser. No. 07/710,363 entitled Driveline Engagment/Disengagement, now U.S. Pat. No. 5,101,688.

BACKGROUND OF THE INVENTION

This invention relates to an improvement in off-road vehicle transmission systems of the type wherein gearshift levers are mechanically linked to couplers to select ranges of gears, and electro-hydraulic powershift clutches are provided to select one gear within a selected range. More specifically, the present invention provides an improvement in such transmissions to obtain a more uniform automatic selection of the effective gear at the time of start-up.

In the transmission system described in the above-referenced applications, three operator controls are provided for gear selection. A High/Low range shift lever is mechanically linked to a first coupler and selects a first or a second range of gear speeds, each range including 8 gear speeds. A 4/5 range shift lever selects one of two sub-ranges within the range selected by the High/Low shift lever, each sub-range including 4 gear speeds. Finally, two powershift push-buttons are provided for controlling electro-hydraulic clutches to select one of four gear speeds within the range defined by the High/Low and 4/5 range select levers. A microprocessor senses the various operator controls and selects a specific powershift gear when the 4/5 shift lever is shifted. That is, powershift gear 4 is selected when the 4/5 shift lever is shifted from its high range position (5) to its low range position (4) and powershift gear 1 is selected when the shift lever is shifted from its low range position to its high range position.

It will be appreciated that in the described system the gear selected at start-up may vary widely depending on the positions of the range shift levers and the selected powershift gear. Even if the powershift gear selection is limited to the lowest powershift gear, the transmission at start-up could be in gear 1, 5, 9 or 13 depending on the positions of the range shift levers. However, it is desirable that the initial gear selection be as nearly constant as possible within the limits imposed by the positions of the shift levers. Furthermore, it is desirable that the transmission not be engaged until the operator has completed a sequence of actions indicating that he is anticipating engagement of the transmission.

SUMMARY OF THE INVENTION

An object of the present invention is to provide an improvement in off-road vehicle transmissions with powershifting under microprocessor control, the improvement providing an automatic and more uniform gear selection at start-up.

In accordance with the principles of the invention, sensors are provided for sensing when the engine is running, a forward/reverse shift lever has been shifted from neutral, or a clutch pedal has been depressed, and whether the vehicle is moving or stationary. A microprocessor is responsive to the sensors for selecting a first or a second initial powershift gear speed depending on the positions of two range shift levers, the selection being such that the initial gear speed ratio selected is kept to a minimum consistent with the shift lever positions. The initial powershift gear selection is made only if the vehicle is not moving, and the electro-hydraulic powershift clutches are engaged only if the microprocessor senses a sequence of conditions comprising the engine running followed by either a shifting of the forward/reverse lever from neutral or a movement of the clutch pedal from a depressed position to a released position.

Another object of the invention is to provide a method and apparatus for selecting the initial powershift gear selected at start-up. When a first range select lever selects a high range of gears, the lowest powershift gear is automatically selected but if the range select lever selects a low range then the highest powershift gear is selected. When the first range select lever selects one of two ranges within each of two ranges selectable by a second range select lever, the position of the second lever determines the powershift gear selected at start-up.

Other objects of the invention and its mode of operation will become apparent upon consideration of the following description and the accompanying drawings.

DETAILED DESCRIPTION OF THE INVENTION

Figure 1:
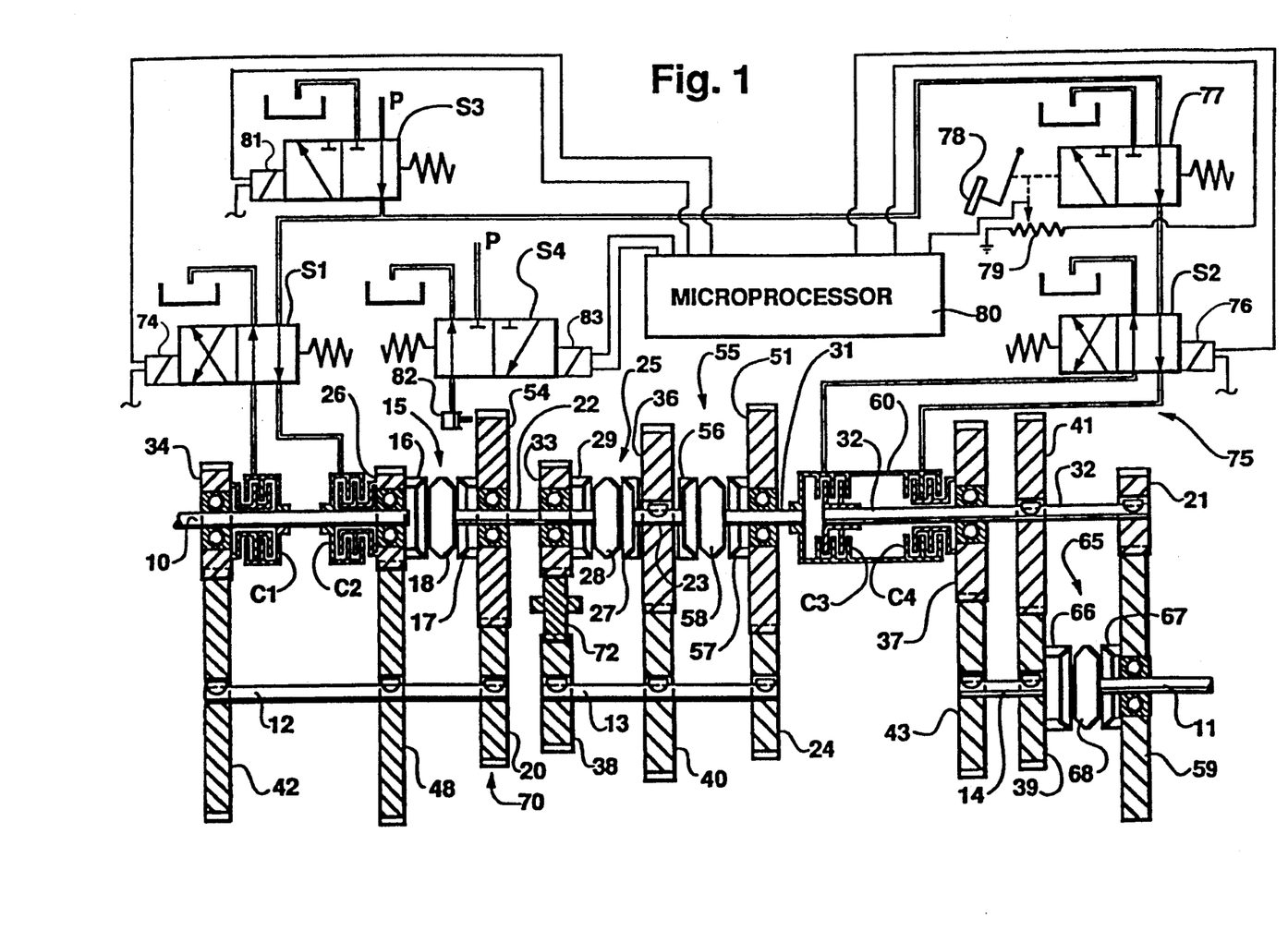
FIG. 1 is a schematic representation of a transmission and its controls.

FIG. 1 is a schematic representation of a microprocessor controlled transmission system for transmitting torque from an input shaft 10 to an output shaft 11 at any one of 16 forward or 16 reverse gear speed ratios. The input shaft 10 receives rotational power directly from an engine (not shown) in a conventional manner. A first drive gear 34 is rotatably mounted on the input shaft 10 for rotation independently thereof. The first drive gear 34 is operatively connected with a first hydraulic clutch C1 mounted on the input shaft 10 such that engagement of the first clutch C1 couples the first drive gear 34 to the input shaft 10 for rotation therewith. Disengagement of the first clutch C1 allows the first drive gear 34 to rotate freely on the input shaft 10. Similarly, a second drive gear 26 is rotatably mounted on the input shaft 10 and operatively connected to a second hydraulic clutch C2 to permit a selective coupling of the second drive gear 26 to the input shaft 10 for rotation therewith upon engagement of the second clutch C2.

A first jack shaft 12 is rotatably supported in the transmission casing (not shown) in a parallel orientation to the input shaft 10. A first transfer gear 42 and a second transfer gear 48 are mounted on the first jack shaft 12 for rotation therewith. The first transfer gear 42 is meshed with the first drive gear 34 to be rotatable therewith, while the second transfer gear 48 is meshed with the second drive gear 26 to be rotatable therewith. A first drive member 16 of a coupler 15 is fixed to the second drive gear 26 to be rotatably driven therewith.

In operation, rotational power is transferred to the first drive member 16 of the coupler 15 from the engine (not shown) along one of two alternate drive paths, providing two speeds of rotation for a given engine output rotation of the input shaft 10. The first drive path provides the slower rotational speed by engagement of the second hydraulic clutch C2 to directly couple the second drive gear 26 to the input shaft 10. The second drive path involves a disengagement of the second clutch C2 and an engagement of the first hydraulic clutch C1 to couple the first drive gear 34 to the input shaft 10. Rotational power is transferred to the intermeshed first transfer gear 42 and to the second transfer gear 48, due to the fixed mounting thereof on the first jack shaft 12, and then to the second drive gear 26 which is rotatable relative to the input shaft 10 to drive the coupler drive member 16 at a faster speed than the speed obtained by directly coupling the second drive gear 26 to the input shaft 10.

The coupler 15 is an optional device associated with the provision of a "creeper" range. In the event a creeper mechanism 70 is not utilized, the shiftable power transfer member 18 of the coupler 15 is connected directly to the first drive member 16 of the coupler 15 to provide direct driving rotation of a first drive shaft portion 22 and a shiftable power transfer member 28 of a second (Forward/Reverse) coupler 25, which is preferably a synchronizing coupler. A reverse drive gear 33 is rotatably mounted on the first drive shaft portion 22 for rotation independently thereof, but is operatively associated with the second synchronizing coupler 25 to provide a selection by the operator between forward and reverse operation of the output shaft 11, as will be described in greater detail below. For purposes of describing the operation of the transmission, the power transfer member 28 of the second synchronizing coupler 25 is deemed to be engaged with the second drive member 27 to effect a direct coupling of the first drive shaft portion 22 with the second drive shaft portion 23 and, thereby effect a normal forward operative driving of the transmission.

The second drive shaft portion 23 is provided with a third drive gear 36 affixed thereto for rotation therewith. The third drive gear 36 is drivingly intermeshed with a third transfer gear 40 affixed to a second jack shaft 13 rotatably supported in the transmission casing (not shown) in a parallel orientation with the second drive shaft portion 23. A fourth transfer gear 24 is also fixed to the second jack shaft 13 for rotation with the third transfer gear 40. A fourth drive gear 51 is rotatably supported on a third drive shaft portion 31 for rotation independently thereof. The fourth drive gear 51 is intermeshed with the fourth transfer gear 24 for a driving relationship therebetween.

A third (4/5) coupler 55, preferably a synchronizing coupler, drivingly interconnects the second drive shaft portion 23 and the third drive shaft portion 31. A first drive member 56 of the synchronizing coupler 55 is connected to and associated with the second drive shaft portion 23, while a second drive member 57 of the coupler 55 is connected to and operatively associated with the fourth drive gear 51. A shiftable power transfer member 58 is connected to the third drive shaft portion 31 and is selectively engageable with either the first or second drive members 56, 57 of the third coupler 55 to effect a transfer of rotational power along a selected one of two alternate paths of rotational power.

Rotational power received by the third drive gear 36 from the driving connection between the first and second drive shaft portions 22, 23 can be transferred to the third drive shaft portion 31 via a first drive path defined by the interengagement of the shiftable power transfer member 58 and the first drive member 56 of the third synchronizing coupler 55 to directly couple the second and third drive shaft portions 23, 31. The alternate drive path is selected when the shiftable power transfer member 58 is selectively engaged with the second drive member 57 of the third coupler 55. Rotational power is transferred along this alternate drive path to the third drive shaft portion 31 from the third drive gear 36 to the third transfer gear 40, which due to the fixed relationship between the third transfer gear 40, the second jack shaft 13, and the fourth transfer gear 24, transfers rotational power to the fourth transfer gear 24 and then to the intermeshed fourth drive gear 51. Since the fourth drive gear 51 is drivingly coupled to the third drive shaft portion 31 via the engagement of the power transfer member 58 and the second drive member 57 of the third coupler 55, the third drive shaft portion 31 is rotated at a slower rotational speed via this alternate drive path for a given rotational speed of the second drive shaft portion 23 than the direct coupling of the second and third drive shaft portions 23, 31.

The third drive shaft portion 31 is connected to the housing or drive half of a clutch pack 60 housing two separate clutches, a third hydraulic clutch C3 and a fourth hydraulic clutch C4. The third clutch C3 is connected to a fourth drive shaft portion 32 such that the engagement of the third hydraulic clutch C3 drivingly couples the third and fourth drive shaft portions 31, 32. The fourth hydraulic clutch C4 is connected to a fifth drive gear 37 rotatably mounted on the fourth drive shaft portion 32 for rotation independently thereof, such that the engagement of the fourth hydraulic clutch C4 drivingly couples the third drive shaft portion 31 to the fifth drive gear 37. Obviously, the third and fourth clutches C3, C4 cannot be simultaneously actuated.

Accordingly, two additional alternate drive paths are provided through the selection afforded by the clutch pack 60. The first of these drive paths is the direct coupling of the third and fourth drive shaft portions 31, 32 through actuation of the third hydraulic clutch C3. The second of these alternate drive paths utilizes actuation of the fourth hydraulic clutch C4 to drivingly couple the third drive shaft portion 31 to the fifth drive gear 37, which transfers rotational power to a fifth transfer gear 43 intermeshed with the fifth drive gear 37 and affixed to a third jack shaft 14. A sixth transfer gear 39 is also affixed to the third jack shaft 14 for rotation coextensively with the fifth transfer gear 37. The sixth transfer gear 39 is meshed with a sixth drive gear 41 affixed to the fourth drive shaft portion 32 to effect rotation thereof when the fourth clutch C4 is actuated.

A fourth (High/Low Range) coupler 65, preferably a synchronizing coupler, provides a final pair of alternate drive paths for rotational power to be transferred to the output shaft 11. The fourth synchronizing coupler 65 includes a first drive member 66 connected to the sixth transfer gear 39 to be rotational with the fifth and sixth transfer gears 43, 39 and the third jack shaft 14, a second drive member 67 connected to and rotatably associated with a seventh transfer gear 59 rotatably mounted on the output shaft 11 to be rotatable independently thereof, and a shiftable power transfer member 68 connected to the output shaft 11 to be rotatable therewith.

A seventh drive gear 21 is also affixed to the fourth drive shaft portion 32 to be rotatable therewith and with the sixth drive gear 41. The first of these two final alternate paths of rotational power transfer is defined by a direct coupling of the shiftable power transfer member 68 to the first drive member 66 of the fourth coupler 65 to drivingly couple the rotation of the sixth transfer gear 39 to the output shaft 11. The final alternate drive path is defined by an engagement of the shiftable power transfer member 68 with the second drive member 67 of the fourth coupler 65 so that the output shaft 11 is driven from the seventh transfer gear 59 which is intermeshed with the seventh drive gear 21 receiving rotational power from the drive fourth drive shaft portion 32. Because of the relative sizes of the seventh drive and transfer gears 21, 59, the output shaft 11 is driven at a slower rotational speed for a given speed of rotation of the fourth drive shaft portion 32 when the output shaft 11 is coupled to the seventh transfer gear 59 rather than the sixth transfer gear 39, which may alternatively receive rotational power from either the driven sixth drive gear 41 or the fifth transfer gear 43 via the driven fifth drive gear 37.

Figure 2:
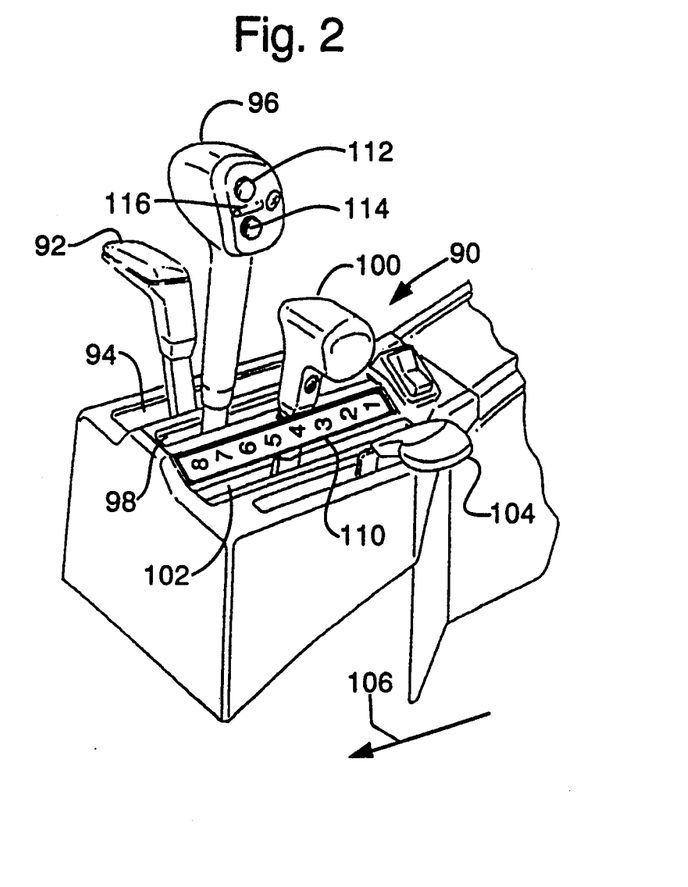
FIG. 2 illustrates the operator controls for controlling the transmission.

Referring to FIG. 2, the operator controls for the transmission are located on a console 90 positioned to the right of the operator as he sits in a seat (not shown) facing forwardly in the direction indicated by arrow 106. The operator controls include a High/Low shift lever 92 movable in a plane extending vertically through a slot 94, a Main or 4/5 shift lever 96 movable or shiftable in a plane extending vertically through a slot 98, and a Forward/Neutral/Reverse (FNR) shift lever 100 movable in a slot 102. A throttle lever 104 is also provided on the console for controlling engine speed.

The High/Low shift lever 92 is connected through a mechanical linkage (not shown) to the High/Low coupler 65 and is shiftable between a low (L) position whereat transfer member 68 of coupler 65 is engaged with the seventh transfer gear 59 and a high (H) position whereat transfer member 68 is engaged with the sixth transfer gear 39.

The 4/5 shift lever 96 is connected through a mechanical linkage (not shown) to the 4/5 coupler 55 and is shiftable between a "4" position whereat the transfer member 58 of the 4/5 coupler 55 engages the fourth drive gear 51 and a "5" position whereat transfer member 58 engages the second drive shaft portion 23.

The FNR shift lever 100 is connected through a mechanical linkage (not shown) to the Forward/Reverse coupler 25 and is shiftable between a forward position (F) whereat transfer member 28 of coupler 25 engages the second drive member 27 and a reverse position (R) whereat transfer member 28 engages the first drive member 29. In FIG. 2, a portion of the FNR shift lever is broken away to fully show a display 110.

The levers 92, 96 and 100 all have a neutral or out-of-gear center position but the neutral of the FNR lever 100 is considered to be the system neutral.

The 4/5 shift lever 96 is provided with an Up-Shift push-button 112 and a Down-Shift push-button 114 for powershifting between gears within ranges selected by the High/Low shift lever 92 and the 4/5 shift lever 96. The push-buttons are positioned on one side of shift lever 96 so that an operator may use the thumb of one hand to selectively actuate the push-buttons while still maintaining a grip on the lever. A ridge or raised portion 116 on the side of the shift lever enables an operator to "find" a thumb position on a desired push-button without actually looking to see which push-button he is touching.

The push-buttons actuate switches and provide input signals to a microprocessor 80. The microprocessor includes a counter which is incremented by one for each actuation of the Up-Shift push-button 112 and decremented by one for each actuation of the Down-Shift push-button 114. The counter is constrained to the count range 1–4 and each count defines a powershift gear selection. The count in the counter determines which clutch is actuated in each of the clutch pairs C1, C2 and C3, C4, as subsequently explained.

One skilled in the art will readily realize from the above description that the transmission, without benefit of the creeper mechanism 70 described below, provides 16 different forward rotational speeds for the output shaft 11 for a given rotational speed of the input shaft 10. These 16 speed variations are accomplished by alternate drive paths provided by (1) the choice between the first and second hydraulic clutches C1 and C2 as determined by the powershift gear selected by push-buttons 112, 114; (2) the engagement of the mechanically shifted third coupler 55 as determined by the 4/5 shift lever 96; (3) the choice between the third and fourth hydraulic clutches C3 and C4 also as determined by the powershift gear selected by push-buttons 112, 114; and (4) the engagement of the mechanically shifted fourth coupler 65 as determined by the position of the High/Low shift lever 92. The sixteen alternative torque transmitting paths should be obvious to one skilled in the art from the foregoing description. Table I indicates typical ratios of input to output shaft speed for various positions of the 4/5 shift lever 96, the High/Low shift lever 92, and the selected powershift gear.

TABLE I

| Range 4/5 | Levers High/Low | Powershift Gear/Clutches | Gear Display | Ratio |
|---|---|---|---|---|
| 4 | Low | 1 C2, C4 | 1L | 8.51 |
| 4 | Low | 2 C2, C3 | 2L | 6.97 |
| 4 | Low | 3 C1, C4 | 3L | 5.69 |
| 4 | Low | 4 C1, C3 | 4L | 4.66 |
| 5 | Low | 1 C2, C4 | 5L | 3.60 |
| 5 | Low | 2 C2, C3 | 6L | 2.95 |
| 5 | Low | 3 C1, C4 | 7L | 2.41 |
| 5 | Low | 4 C1, C3 | 8L | 1.97 |
| 4 | High | 1 C2, C4 | 1H | 2.74 |
| 4 | High | 2 C2, C3 | 2H | 2.25 |
| 4 | High | 3 C1, C4 | 3H | 1.84 |

TABLE I-continued

| Range 4/5 | Levers High/Low | Powershift Gear/Clutches | Gear Display | Ratio |
| --- | --- | --- | --- | --- |
| 4 | High | 4 C1, C3 | 4H | 1.50 |
| 5 | High | 1 C2, C4 | 5H | 1.16 |
| 5 | High | 2 C2. C3 | 6H | 0.95 |
| 5 | High | 3 C1, C4 | 7H | 0.78 |
| 5 | High | 4 C1, C3 | 8H | 0.64 |

TABLE I

From Table I, several observations may be made. The High/Low shift lever 92 permits the operator to select a low range of speeds 1L-8L or a high range of speeds 1H-8H. The 4/5 shift lever 96 divides each of these ranges into two sub-ranges designated the 4 range and the 5 range each having four possible speeds. Within each sub-range, the Up-Shift and Down-Shift push-buttons may be utilized to select one of the four speeds within the sub-range.

Returning now to the creeper mechanism 70, an additional 16 speeds of operation of the output shaft 11 (8 forward and 8 reverse) for a given speed of operation of the input shaft 10 can be obtained. The creeper mechanism 70 is an optional device. If the creeper mechanism 70 is not desired, the shiftable power transfer member 18 of the first coupler 15 is directly connected to the first drive member 16 so that the power transfer member 18 cannot be shifted out of engagement with the first drive member 16. The creeper mechanism 70 includes a creeper drive gear 54 rotatably mounted on the first drive shaft portion 22 to be rotatable independently thereof. The creeper drive gear 54 has a second drive member 17 of the first coupler 15 affixed thereto. A creeper transfer gear 20, smaller than the creeper drive gear 54, is affixed to the first jack shaft 12 for rotation with the first jack shaft 12 and the first and second transfer gear 42, 48, and placed in intermeshing relationship with the creeper drive gear 54. A spring (not shown) normally biases the creeper drive gear 54 and drive member 17 out of engagement with the power transfer member 18.

The creeper mechanism 70 is activated by actuating a piston 82 as described below which acts against the gear 54 to move drive member 17 into engagement with the power transfer member 18 of the first coupler 15. Instead of rotational power being transferred to the first drive shaft portion 22 via the second drive gear 26, rotational power is transferred from the first jack shaft 12 to the creeper transfer gear 20 and to the intermeshed creeper drive gear 54, and then to the first drive shaft portion 22 through the coupler 15. In instances where the first clutch C1 is engaged, rotational power is transferred from the input shaft 10 to the first drive gear 34, the first transfer gear 42, and the first jack shaft 12 so that the intermeshed second drive gear 26 and second transfer gear 48 are rotated without effect. When the second clutch C2 is engaged, rotational power reaches the first jack shaft 12 via the second drive gear 26 and the intermeshed second transfer gear 48, so that the first drive gear 34 is rotated on the input shaft 10 without effect by the driven first transfer gear 42.

The creeper mechanism 70 is actuated by operating a switch 170 (FIG. 3) associated with the operator controls. The microprocessor 80 may respond to operation of the switch to cause actuation of piston 82 only if certain conditions are present as subsequently described.

The reverse operating capabilities of the transmission are actuated by an engagement of the shiftable power transfer member 28 with the first drive member 29 of the second coupler 25, rather than the second drive member 27. This is accomplished through a mechanical linkage by moving the FNR lever 100 (FIG. 2) to the reverse (R) position. Rotational power received by the first drive shaft portion 22, whether via the second drive gear 26 or the creeper drive gear 54, is then transferred through the second coupler 25 to the reverse drive gear 33. A reverse transfer gear 38 is affixed to the second jack shaft 13 for rotation therewith. A reversing idler 72 is rotatably supported from the transmission casing (not shown) for intermeshing engagement with both the reverse drive gear 33 and the reverse transfer gear 38. As a result, the direction of rotation of the second jack shaft 13 is reversed when power is transferred through the reverse drive gear 33, when compared to the rotation of the second jack shaft 13 when power is transferred thereto from the third drive gear 36.

In operation, the second coupler 25 controls the forward/reverse operation of the transmission in response to movement of the FNR lever 100. When the shiftable power transfer member 28 is engaged with the second drive member 27 of the second coupler 25, the output shaft 11 is rotated in a normal forward direction of rotation. Shifting the power transfer member 28 to the first drive member 29 of the second coupler 25 effects a transfer of rotational power from the first drive shaft portion 22 to the reverse drive gear 33, which in turn transfers the rotational power through the reversing idler 72 to the reverse transfer gear 38 to rotate the second jack shaft 13 in the opposing direction to that described above with respect to the normal forward operation of the transmission. The rotational power is then transferred from the third transfer gear 40 to the intermeshed third drive gear 36 to cause rotation of the second drive shaft portion 23 in a reverse direction.

Although all the transmission components "downstream" of the second drive shaft portion 23 will then rotate in the opposite direction to that described above with respect to the normal forward operation of the transmission, ultimately causing the output shaft 11 to rotate in a normal reverse direction, all of the gear selection alternatives noted above are equally applicable when the reverse drive gear 33 has been engaged. Accordingly, the output shaft 11 of the transmission is capable of operation at 16 different speeds in both the forward and reverse modes. Furthermore, when the creeper mechanism 70 is actuated, gear ratios are increased by a factor of about 5.08 times those shown in Table I. The microprocessor 80 prevents actuation of the creeper mechanism when the High/Low shift lever 92 selects the high range. Thus, the creeper mechanism provides 8 additional forward gear speed ratios and 8 additional reverse gear speed ratios making a total of 24 available gear speed ratios in each direction.

The control system 75 for the transmission involves both mechanical and hydraulic control mechanisms, as well as the microprocessor 80 for automatic control of the hydraulic control mechanisms. As noted above, the couplers 25, 55 and 65 can be shifted mechanically through conventional linkages by means of shift levers 92, 96 and 100. The hydraulic powershift clutches C1 and C2 are controlled through a first electro-hydraulic solenoid valve S1 actuated by a solenoid 74, while the other pair of hydraulic powershift clutches C3 and C4 is controlled through a second electro-hydraulic solenoid valve S2 actuated by a solenoid 76. Both valves S1 and S2 are two position spool valves that direct a flow of hydraulic fluid to a selected one of the hydraulic clutches in a pair. As a result, both clutches in each pair of hydraulic clutches cannot be simultaneously actuated. FIG. 1 depicts the positions of valves S1 and S2 when their solenoids 74 and 76 are not energized. Solenoids 74 and 76 are controlled by microprocessor 80 in response to actuation of the Up-Shift and Down-Shift push-buttons 112, 114 and movement of the range shift levers 92 and 96 as subsequently described.

The control system 75 further includes a modulating hydraulic valve 77 that is operatively connected to the clutch pedal 78 of the tractor (not shown). The modulating valve 77 controls the flow of hydraulic fluid to the second solenoid valve S2 in response to the position of the clutch pedal 78, such that the amount of hydraulic fluid sent to the clutch pack 60 through the second solenoid valve S2 varies proportionately with the position of the clutch pedal 78 between a fully depressed and a fully retracted position. As a result, the torque carrying capability of the hydraulic clutches C3 and C4 can be feathered for a smooth start-up operation of the transmission in transferring rotational power from the input shaft 10 to the output shaft 11, particularly under load conditions.

The control system 75 also includes an electro-hydraulic dump valve S3 which is actuated by a solenoid 81 and controls the flow of hydraulic fluid to the hydraulic valves S1, S2 and 77. The valve S3 is shown in the position it occupies when solenoid 81 is not energized. A shifting of the master solenoid valve S3 to the "dump" position (solenoid 81 energized) releases all the pressure from the hydraulic clutches C1, C2, C3 and C4 and places the transmission in a "neutral" condition. The microprocessor 80 is operatively associated with the solenoids of all the two position solenoid valves S1, S2, S3 and S4 to control the positioning thereof and the direction of flow of hydraulic fluid to the powershift clutches C1, C2, C3 and C4 and to the creeper hydraulic piston 82. The clutch pedal 78 is operatively connected to a potentiometer 79, which in turn is connected to the microprocessor 80, to serve as a position sensor for the clutch pedal 78.

When the clutch pedal 78 reaches a predetermined position, preferably near the fully depressed position, it acts through valve 77 to release substantially all the hydraulic pressure from the clutch pack 60. When the microprocessor 80 senses that the clutch pedal has been depressed to a threshold level it actuates the dump valve S3 to release the pressure from all the hydraulic clutches C1, C2, C3 and C4. This minimizes wear on the gear synchros during a shift since the synchros are completely de-coupled from the engine during a shift.

The creeper mechanism 70 is actuated through a separate creeper hydraulic valve S4 operatively connected to a hydraulic piston 82 effective to shift the first coupler 15 as described above. The creeper hydraulic valve S4 is actuated by a solenoid 83 that is controlled by microprocessor 80. The dump valve S3 must be dumped to place the transmission in a "neutral" position to permit the non-synchronized first coupler 15 to shift as smoothly as possible. Release of the creeper mechanism 70 is effected by a spring (not shown) when the microprocessor 80 de-energizes solenoid 83 so that fluid in the cylinder for piston 82 may flow out to the sump. One skilled in the art will readily realize that the creeper solenoid valve S4 is not operatively associated with the dump valve S3 so that the piston 82 can be shifted even when the dump valve S3 is in the "dump" position.

Briefly, the microprocessor 80 may be a type 8061 microprocessor of the type used by Ford Motor Company for automotive control. The microprocessor includes analog to digital converter input channels and a frequency input channel in addition to digital inputs. It also includes a power supply responsive to the tractor battery voltage for producing a regulated +5V voltage. In addition to the usual ROM and RAM memories and data processing circuits the microprocessor includes a "keep-alive" RAM powered directly from the tractor battery so that data in the memory is not lost when the tractor ignition switch is turned off.

Figure 3:
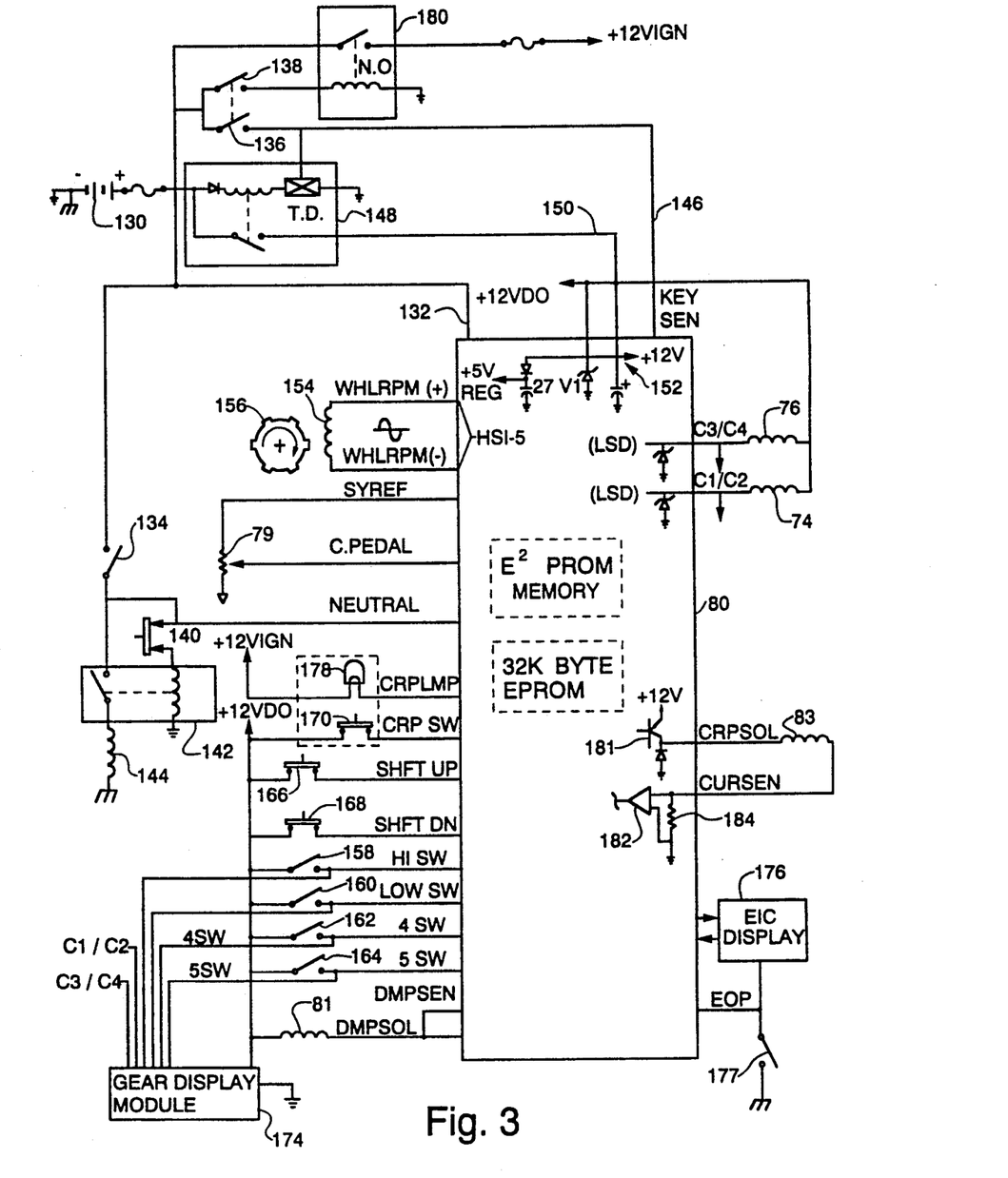
FIG. 3 is a schematic wiring diagram illustrating inputs to and outputs from a microprocessor controlling the transmission.

Referring now to FIG. 3, the tractor battery 130 is directly connected to the microprocessor 80 via a lead 132 to power the keep-alive memory. The battery is also connected to three sets of ignition switch contacts 134, 136 and 138. Switch contacts 134 are closed only when the ignition key is turned to the "crank" position. The FNR lever 100 (FIG. 2) controls a switch 140 and closes the switch when the lever is in the neutral position. If the lever 100 is in neutral when the ignition key is turned to the crank position, a start relay 142 is energized. The start relay closes its normally open contacts thus establishing a circuit from the battery through the ignition switch contacts 134 and the contacts of relay 142 to an engine starter coil 144. After the tractor engine starts, the operator releases the ignition key and it moves to a "run" position to open contacts 134.

Switch contacts 136 and 138 remain closed when the ignition key is released to the run position. When contacts 136 are closed they apply battery voltage to a data input of the microprocessor 80 over lead 146 and to a time delay relay 148. The relay 148 is energized and closes its normally open contacts so that the battery voltage +12VDO appears on lead 150. The relay 148 remains energized for about 8 seconds after ignition switch contacts 136 are opened so that power is available to microprocessor 80 for this interval after the ignition key is turned to its "off" position.

The voltage +12VDO is applied to one end of solenoids 74 and 76 which control the valves S1 and S2, respectively. These solenoids are selectively energized by the microprocessor 80 by selectively connecting the other ends of the solenoids to ground through a low-side driver (not shown).

When +12VDO is applied to the microprocessor 80 the power supply circuits 152 therein generate the voltage +5V for powering the circuits within the microprocessor. The +5V is continuously applied to the clutch pedal potentiometer 79 as the signal SVREF and the output signal from the potentiometer is applied to one of the analog input channels of the microprocessor.

The frequency input of microprocessor 80 is connected to a sensor 154 which senses the teeth on a gear 156. The gear is affixed to the transmission output shaft 11 and as the tractor moves sensor 154 produces an output signal to the microprocessor, the frequency of the output signal being proportional to the ground speed of the tractor.

In addition to shifting the couplers 25, 55 and 65 as described above, movement of levers 92, 96 and 100 also causes actuation of switches to provide input signals to the microprocessor indicating the position of the switches. The High/Low shift lever 92 closes a High switch 158 when the lever is in the H position and a Low switch 160 when it is in the L position. The 4/5 lever 96 closes a "4" switch 162 when it is in the "4" position and a "5" switch 164 when it is in the "5" position. Switches 158, 160, 162 and 164 may be ball switches operated by sliding movement of the transmission shift rail (not shown) as the rail is moved by one of the levers 92 or 96.

When the FNR lever 100 is in the neutral position it closes the switch 140. As described above, switch 140 must be closed in order to start the engine which drives the transmission input shaft 10.

The Up-shift and Down-Shift push-buttons 112, 114 are located on the 4/5 lever 96 control closure of two switches 166 and 168, respectively. These are momentary switches in that the microprocessor 80 senses for a change in the level of the signals it receives from these switches. This may be accomplished by saving each sampling of a switch and comparing it with the next succeeding sampling.

Associated with the operator controls is a creeper switch having contacts 170. The creeper switch is also a momentary switch which toggles between creeper gear engagement and dis-engagement provided that conditions are right for entry into, or exit from, the creeper mode. An open-to-closed transition of the creeper switch contacts 170 is sensed by microprocessor 80 to initiate entry into, or exit from, the creeper mode.

The switch contacts 158, 160, 162, 164, 166, 168 and 170 are connected to +12VDO so that the switches are "alive" for eight seconds after the ignition switch is turned off. In addition to applying signals to the microprocessor 80, the switch contacts 158, 160, 162 and 164 are connected to a gear display module 174. The module 174 includes logic responsive to the conditions of the 4/5 shift lever switches 162 and 164, and the states of the signals C1/C2 and C3/C4 produced by microprocessor 80 to energize the clutch valve solenoids 74 and 76, and to control the lighting of one of the numerals 1 through 8 on the strip display 110 (FIG. 2). This display may comprise eight lamps backlighting a translucent panel bearing the numerals.

The display module also receives a signal when either of the switches 158 or 160 is closed. One of these switches must be closed, that is, the High/Low lever 92 must not be in neutral, for the display 110 to be lighted.

Although there are 16 forward or reverse gear speeds, the display 110 displays only eight speeds. The reason for this is explained below. A separate electronic instrument cluster (EIC) 176 includes a segmented display on the tractor dashboard for displaying the numerals 1 through 8 with an "H" or an "L" to fully indicate the selected gear speed. The electronic instrument cluster is connected to microprocessor 80 via serial data links and includes sensors for sensing various tractor conditions not relevant to the present invention.

The EIC display 176 and a creeper lamp 178 are powered by a voltage +12VIGN which is available as long as the ignition key is in the "run" position. The ignition switch contact 138 energizes a relay 180 which closes its contacts so that +12VIGN is derived directly from battery 130. The creeper lamp 178 is turned on by microprocessor 80 when the creeper mechanism is engaged and the microprocessor causes the lamp to flash in the event tests of the creeper mechanism should not be normal.

Insofar as control of the transmission is concerned, the microprocessor 80 produces four output signals.

They are the low-level signals C1/C2 and C3/C4 for energizing the solenoids 74 and 76 of the clutch control valves S1 and S2, the low level signal DMPSOL which energizes the solenoid 81 of the dump valve S3, and the high level signal CRPSOL which energizes the solenoid 83 of the creeper valve S4. The solenoids 74, 76 and 81 are connected to +12VDO so that the solenoids may remain energized for an interval after the ignition switch is turned to the "off" position.

Generally speaking, the microprocessor 80 executes a power-on reset followed by an Initialization routine when the ignition switch is turned on. During initialization, two flags designated STARTUP and FIRST RANGE are reset to zero, a memory location POWERSHIFT GEAR is set to the value 2 and a memory location OLD RANGE is set to zero as indicated by step 400 in FIG. 4A.

Figure 4A:
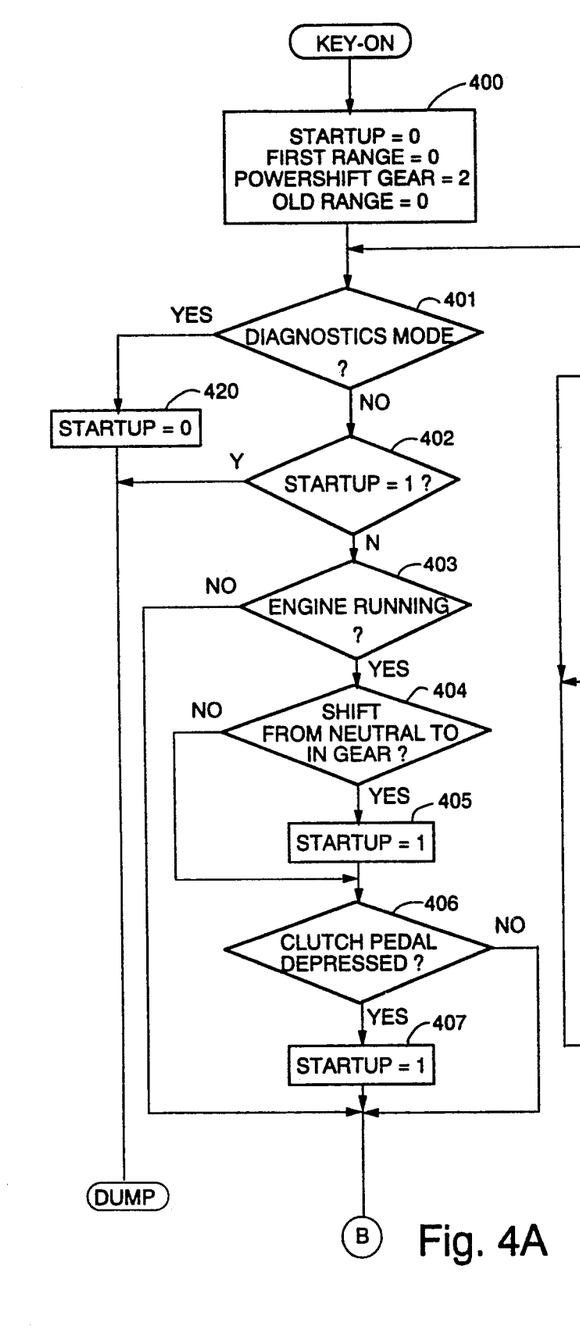
FIGS. 4A and 4B illustrate the Start-Up routine executed by the microprocessor.

The flag STARTUP is set during execution of a Startup routine as subsequently described and, when set, indicates that a proper sequence of events has taken place such that the driveline may be engaged, that is, the dump valve solenoid 81 may be de-energized so that the engine and input shaft 10 drive the transmission through clutch C1 or C2. There are different conditions for setting START-UP depending on whether the tractor is, or is not, moving. If the tractor is not moving STARTUP is set if the engine is running and (1) there is a transition of the FNR lever 100 from neutral to forward or reverse or (2) there is a transition of the clutch pedal from a disengaged to an engaged position. STARTUP is always set the first time the Startup routine is executed if the tractor is rolling. Once set, STARTUP remains set until the ignition is turned off or the operator initiates a diagnostic mode.

The flag FIRST RANGE, when set, enables lighting of the EIC display 176. It is set as subsequently described, and once set it remains set until the ignition is turned off. This flag also controls the initial powershift gear selected during startup.

The memory location POWERSHIFT GEAR stores a value of from 1 to 4. This value determines what output signals the microprocessor 80 produces to energize the solenoids 74 and 76. It thus determines the selected powershift gear speed ratio.

OLD RANGE is a memory location which is used to save an indication of the position of the 4/5 shift lever 92 during a range shift.

The microprocessor program may best be understood by first considering a normal start, that is, the tractor is not moving, the ignition key is turned to the crank position with FNR lever 100 in neutral to start the engine, and the clutch pedal is depressed. The High/Low shift lever 92 and the 4/5 shift lever 96 may be in any position. Once the initialization at step 400 has been completed the microprocessor checks a switch (not shown) at step 401 to see if the operator has indicated a desire to enter a diagnostic mode by actuating the switch. If the operator has actuated the diagnostics switch, the program branches to step 420 where STARTUP is cleared before the program moves to a Dump routine described below. The diagnostic mode is not elevant to the present invention and will not be further described.

If the test at step 401 proves false, STARTUP is tested at step 402. The first time step 402 is executed after the ignition key is turned on, STARTUP will be zero since it was reset at step 400 during initialization. The program then tests the output of an engine oil pressure switch 177 (FIG. 3) to see if the engine is running. Assuming a normal start-up. The test at step 403 proves false and the program moves directly to step 408 (FIG. 4B) where the microprocessor senses the out-ut of the speed sensor 154 and compares it with a value START THRESH. Under the assumed conditions the test at step 408 proves false and the program branches to the Dump routine illustrated in FIG. 5.

Figures 5, 6:
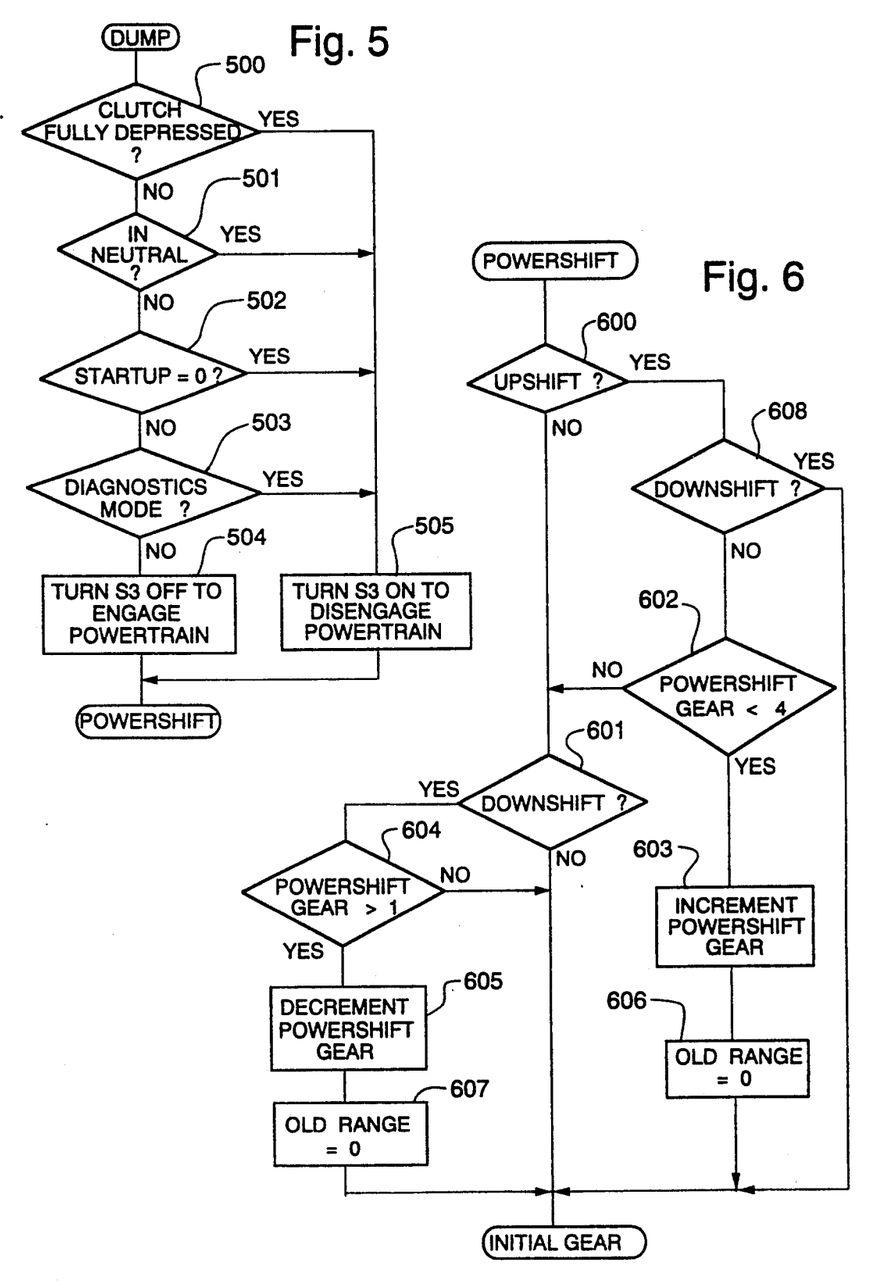
FIG. 5 illustrates a routine for controlling the dump solenoid.
FIG. 6 illustrates a routine for changing powershift gear selection.

The purpose of the Dump routine is to control the solenoid 81 associated with the dump valve S3, thereby enabling the drive train to be engaged or disengaged by engaging or disengaging clutches C1-C4.

At step 500, the output of the clutch pedal potentiometer 79 is again tested and since it is assumed that the clutch pedal is depressed the program branches to step 505 where the microprocessor produces an output signal DUMPSOL to energize solenoid 81. When the solenoid is energized, the hydraulic fluid is dumped through the dump valve S3 thereby ensuring that the clutches C1-C4 are disengaged.

After the clutches C1-C4 are disengaged, the program advances to a Powershift routine as shown in FIG. 6. The Powershift routine is the routine which increments or decrements the value POWERSHIFT GEAR each time the operator depresses one of the powershift push-buttons 112, 114. The Up-Shift push-button switch contacts 166 are tested for a signal level transition at step 600 and the Down-Shift push-button switch contacts 168 are similarly tested at step 601. This is accomplished by sensing the present states of the contacts at steps 600 and 601, saving indications of the states in memory, and comparing the saved indications with the states sensed the next time steps 600 and 601 are executed. Assuming that the operator has not depressed either powershift push-button, the tests at steps 600 and 601 prove false and the program advances to step 700 of the Initial Gear selection routine shown in FIG. 7.

Figure 7:
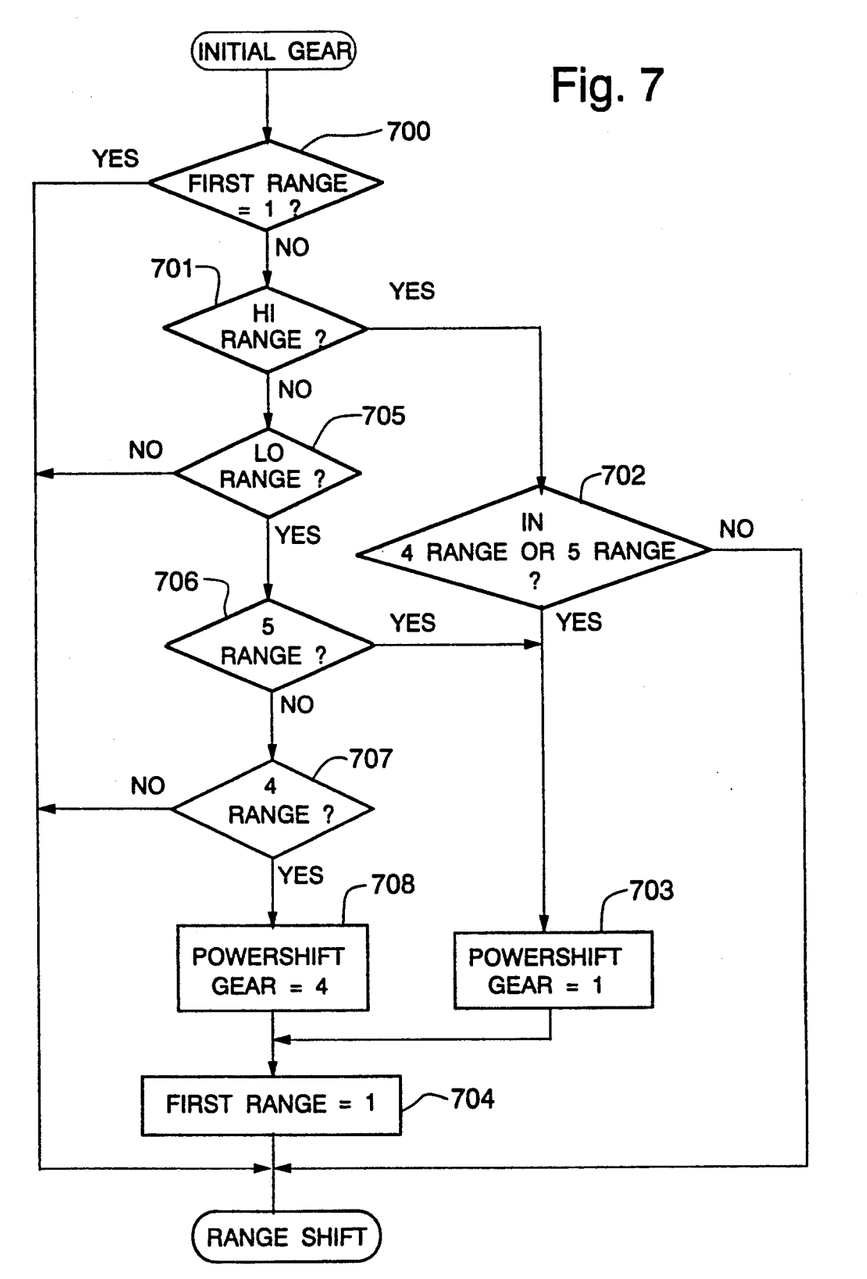
FIG. 7 illustrates a routine for making an initial selection of a powershift gear.

The purpose of the Initial Gear routine is to make an initial powershift gear selection during a start-up so as to give a nearly consistent smooth starting speed without being too slow. Generally speaking, if the 4/5 shift level 96 is in the "4" position and the High/Low shift lever 92 is in the low position, powershift gear 4 is selected. For all other conditions of the shift levers (excluding neutral) powershift gear 1 is selected. Table II shows the initial gear selection during a normal startup for various positions of the 4/5 and High/Low shift levers.

TABLE II

| ranges 4/5 | levers High/Low | powershift gear | initial gear |
| --- | --- | --- | --- |
| 4 | Low | 4 | 4L |
| 5 | Low | 1 | 5L |
| 4 | High | 1 | 1H |
| 5 | High | 1 | 5H |

In FIG. 7, the flag FIRST RANGE has not been set so the test of this flag at step 700 proves false. The routine moves to step 701 to check if the High/Low shift lever 92 is set for the high range (switch 158 closed). If it is, the 4/5 shift lever switches 162 and 164 are tested at step 702 to see if the 4/5 shift lever 96 is in either the 4 or 5 position. If it is, location POWERSHIFT GEAR is set to one at step 703 and the flag FIRST RANGE is set at step 704 before an exit is made from the routine. The initial gear selection will thus be 1H or 5H depending on whether the 4/5 shift lever is set to the "4" or "5" position, respectively.

If the test at step 701 shows that the High/Low shift lever is not set for the high range, a test is made at step 705 to see if it is set for the low range (switch 160 closed). Assuming for the moment that the test at step 705 proves true, a test is made at step 706 to see if the 4/5 shift lever is set for the "5" position (switch 164 closed). If it is, the routine branches to step 703 to again select powershift gear 1 and set FIRST RANGE at step 704. The initial gear selection in this case will thus be 5L. On the other hand, if the test at step 706 proves false, the 4/5 lever is tested at step 707 to see if it is in the "4" position (switch 162 closed). If it is, step 708 is executed to set location POWERSHIFT GEAR to four before FIRST RANGE is set at step 704. The initial gear selection in this case is thus 4L.

If the test at step 705 proves false, it means that the High/Low select lever is in its neutral position. In this case an exit is made from the Initial Gear selection routine to a Range Shift routine (FIG. 8) without setting FIRST RANGE or making an initial powershift gear selection since the transmission cannot transmit torque from its input shaft to its output shaft when the High/Low lever is in neutral. The value in POWERSHIFT GEAR continues to hold the value 2 entered therein at step 400.

In like manner, if the test at step 702 or 707 proves false no initial powershift gear selection is made because the transmission cannot transmit torque from the input shaft to the output shaft when the 4/5 shift lever is in neutral. The routine branches to step 805 of the Range Shift routine shown in FIG. 8 with the value 2 still in POWERSHIFT GEAR and FIRST RANGE still reset.

Figure 8:
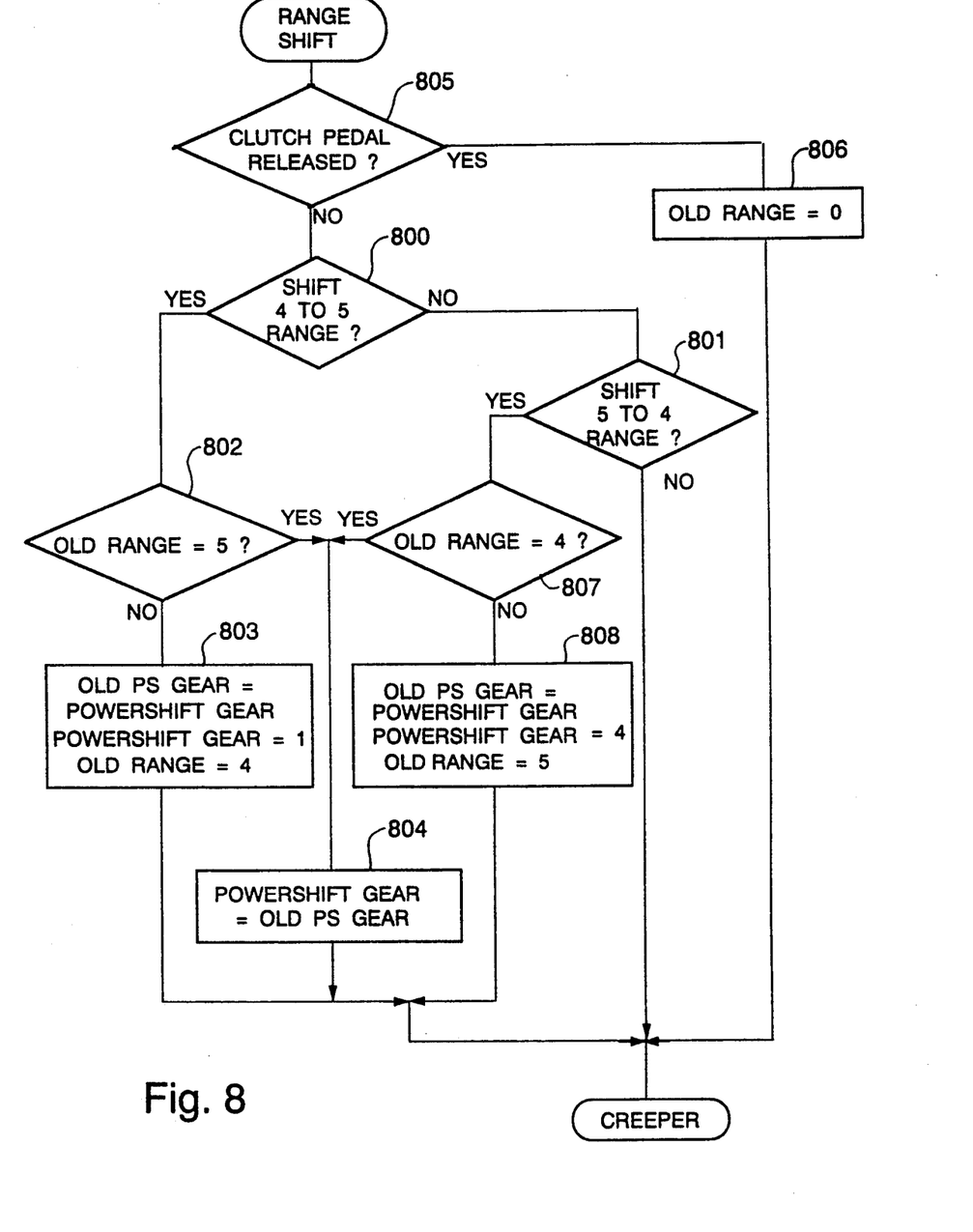
FIG. 8 illustrates a routine for changing powershift gear selection in response to shifting of a range shift lever; and, FIG. 9 illustrates a routine for engaging or disengaging a creeper gear.

The purpose of the Range Shift routine is to change the selected powershift gear when the 4/5 range shift lever 96 is shifted so as to provide a more gradual speed increase or decrease. That is, when the 4/5 shift lever is shifted from the "4" to the "5" position, the Range Shift routine automatically selects powershift gear 1 by setting location POWERSHIFT GEAR to 1 regardless of its count at the time the lever is shifted. On the other hand, when the 4/5 shift lever is shifted from the "5" to the "4" position the Range Shift routine selects powershift 10 gear 4 by setting POWERSHIFT GEAR to 4. The Range Shift routine also includes "change of mind" logic which permits POWERSHIFT GEAR to be restored to its initial value if the 4/5 shift lever is shifted and then returned to its initial position before the clutch pedal is released.

At step 805 the potentiometer 79 is tested to see if the clutch pedal is released. Since it is assumed that the clutch pedal is depressed, the test at step 805 proves false and the program moves to step 800 where it tests to see if the 4/5 shift lever has been shifted from the 4 to the 5 position. In this regard, the microprocessor 80 saves the status of switches 158, 160, 162 and 164 so that a comparison may be made between the previously sensed status and the present status. Under the assumed conditions, the 4/5 shift lever has not been moved so the test at step 800 proves false. For the same reason, the test at step 801 proves false since the 4/5 shift lever has not been shifted from its "5" to its "4" position. An exit is made from step 801 to the Creeper routine shown in FIG. 9.

Figure 9:
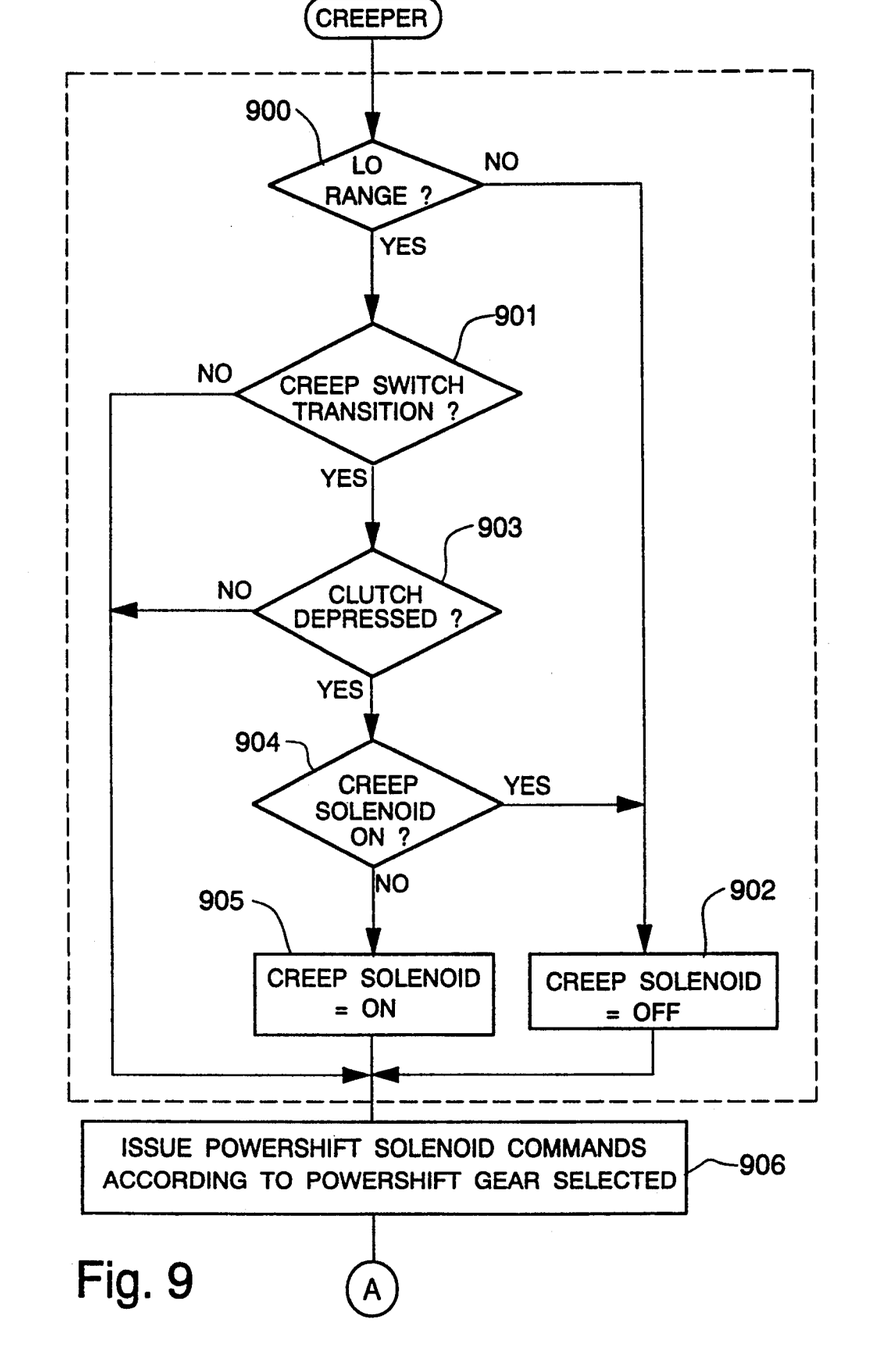

The Creeper routine is provided to control the creeper valve S4 which in turn controls engagement of the creeper gear 54 by actuating piston 82. At step 900, the High/Low shift lever switch 158 is tested to see if the High/Low shift lever is positioned for the low range. If the High/Low shift lever is not in the low position the creeper gear cannot be engaged. The program jumps to step 902 where the microprocessor output de-energizes the solenoid 83 of the creeper valve S4. If the test at step 900 proves true, the creeper switch contacts 170 are tested for a transition. Assuming the operator has not actuated the creeper switch the program branches to step 906 without changing the state of the creeper valve solenoid 83.

After step 901 is executed the program moves to step 906 which sends the signals C1/C2 and C3/C4 to the solenoids 74 and 76 to actuate the clutch valves C1–C4 according to the value stored at location POWER-SHIFT GEAR. At this point POWERSHIFT GEAR contains the value entered therein at step 703 or 708 if the range shift levers 92 and 96 are both out of neutral or the value 2 (from step 400) if one or both of the shift levers is in neutral. However, the drive train is not engaged because the dump valve is in its dump position.

Execution of step 906 completes one cycle of the microprocessor program and it branches back to step 401 (FIG. 4). Assuming for the moment that the engine has not yet started and the operator does not shift any levers or release the clutch pedal, the program is repeated as described above with one possible exception. In FIG. 7, if neither the High/Low shift lever 92 nor the 4/5 shift lever 96 was in neutral, the flag FIRST RANGE was set at step 704 during the first execution of the program. Therefore, on the second and subsequent executions of the program a jump is made from step 700 to the Range Shift routine without changing the value entered into POWERSHIFT GEAR during the first execution.

On the other hand, if either of the shift levers 92 or 96 was in neutral during the first execution the flag FIRST RANGE was not set. Therefore, if the next action of the operator is to move one or both of the shift levers so that neither is in neutral then the flag FIRST RANGE is set at step 704 and location POWERSHIFT GEAR is changed at step 703 or 708, depending on the lever positions, the next time the Initial Gear routine is executed.

Assume now that the engine starts. After the engine is running, the next test of switch 177 at step 403 proves true and at step 404 the FNR shift lever switch is tested to see if the lever has been shifted from neutral, required to start the engine, to either forward or reverse. Assuming there has been no shift, the program moves directly to step 406.

Figure 4B:
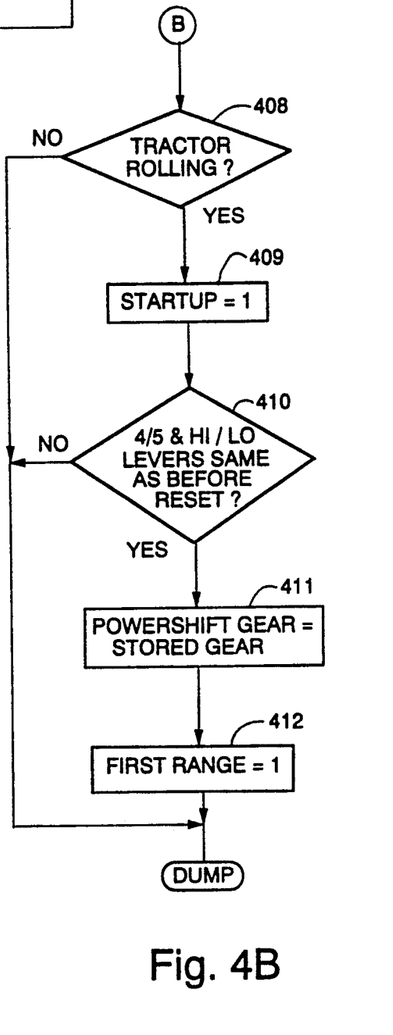

At step 406, the output of clutch pedal potentiometer 79 is tested to see if the clutch pedal is depressed. Assuming that the clutch pedal is still depressed, STARTUP is set at step 407 and the test at step 408 proves false so the routine moves to step 500. Since the clutch pedal is still depressed, the program moves to step 505 as previously described to energize the dump valve solenoid. The program sequences through the remaining steps as described above. However, on the next and subsequent executions of the program it will branch directly from step 402 to the Dump routine because the flag STARTUP has been set.

If the operator starts the engine without depressing the clutch pedal and he first moves the FNR shift lever out of neutral to either the forward or reverse position without depressing the clutch pedal the program detects this shift at step 404 and sets the flag STARTUP at step 405. The released clutch pedal condition is detected at step 406 and when the test is made at step 408 to see if the tractor, is moving the program jumps to step 500. The clutch pedal is released so the program proceeds to step 501 where the neutral switch 140 is tested and found to be open. The program then tests STARTUP at step 502 and since the flag is now set the program tests at step 503 for operation of the Diagnostic mode switch. Assuming the switch is not actuated, the program moves to step 504 where the microprocessor de-energizes solenoid 81 of the dump valve S3. Hydraulic pressure is thus applied through the dump valve to selected ones of the clutches C1–C4 thereby engaging the drive train. The particular clutches energized depends on the powershift solenoid commands set up to the solenoids of valves S1 and S2 the last time step 906 was executed. Since the flag STARTUP was set at step 405, any subsequent executions of the program find the flag set when step 402 is executed so that steps 403–407 are skipped.

Once the flag STARTUP is set as described above, the program follows a sequence which comprises steps 401, 402, the Dump routine of FIG. 5, the Powershift routine of FIG. 6, step 700, the Range Shift routine of FIG. 8 and the Creeper routine of FIG. 9.

Each execution of the Dump routine sets the output to the dump valve solenoid 81 so that hydraulic pressure to clutches C1–C4 is maintained and the driveline remains engaged. The driveline is disengaged only if the clutch is depressed, the FNR shift lever is moved to neutral, or the diagnostic mode switch is actuated.

Each execution of the Powershift routine will vary depending on whether or not a powershift push-button 112, 114 is actuated. If neither push-button is actuated, steps 600 and 601 are executed as described above and location POWERSHIFT GEAR remains unchanged. If the Up-Shift push-button 112 is actuated, the test at step 600 proves true. The Down-Shift push-button 114 is tested at step 608 to make sure that both shift push-buttons 112 and 114 are not being pressed. If the test at step 608 proves true then the program jumps to the Initial Gear routine without changing POWERSHIFT GEAR. If step 608 proves false then the program proceeds to step 602. POWERSHIFT GEAR is tested at step 602 and if it is less than 4 it is incremented at step 603 and a location OLD RANGE is cleared at step 606. If POWERSHIFT GEAR is already at 4, the test at step 602 proves false and the program moves to step 601 without incrementing POWERSHIFT GEAR.

If the Down-Shift push-button is depressed, the action is detected at step 601 and the program branches to step 604 where POWERSHIFT GEAR is tested to see if it is greater than 1. If it is, POWERSHIFT GEAR is decremented at step 605 and location OLD RANGE is cleared at step 607. If the test at step 604 shows that POWERSHIFT GEAR is already 1, it is not modified.

The Range Shift routine comes into play only if there is a shift of the 4/5 shift lever 96 from the 4 range to the 5 range or the 5 range to the 4 range. Its purpose is to make the shift as smooth as possible, that is, make the change in gear speed ratios as small as possible when a shift is made between the two ranges. It does this by selecting the highest powershift gear (4) when there is a shift from the 5 to the 4 range and/ selecting the lowest powershift gear (1) when there is a shift from the 4 to the 5 range. The Range Shift routine also includes logic for restoring the value in POWERSHIFT GEAR in the event the operator depresses the clutch pedal, shifts the 4/5 shift lever, then changes his mind and returns the 4/5 shift lever to its original position before releasing the clutch above a threshold point. In this regard, the microprocessor digitizes the output signal from the clutch pedal potentiometer and compares it with a threshold value PCLUTCH THR to determine when the clutch pedal is at or above the threshold point.

Depression of the clutch pedal is detected at step 805 and the program moves to step 800. Assuming no change in the position of the 4/5 shift lever, the tests at steps 800 and 801 both prove false and POWERSHIFT GEAR is not changed when the routine is executed. If there is a shift from the 4 to 5 range, this is detected at step 800 and POWERSHIFT GEAR is set to 1 at step 803 since OLD RANGE will contain a value of zero when the test is made at step 802. On the other hand, if there is a shift from the 5 range to the 4 range, this is detected at step 801 and POWERSHIFT GEAR is set to 4 at step 808 since OLD RANGE will contain a zero when the test is made at step 807.

The advantage of the range shift logic is evident from Table I. Assume that the transmission is in, for example, gear 5L and the 4/5 shift lever is moved to the 4 range. Without the range shift logic, the powershift gear selection would remain unchanged so that gear 1L would be selected. The gear speed ratio would change from 3.60 to 8.51. On the other hand, with the range shift logic in effect, the powershift gear is changed from 1 to 4 when the 4/5 shift lever is moved so that gear 4L is selected. In this case the gear speed ratio changes from 3.60 to 4.66 thus providing a smaller change in the gear speed ratio.

Similar range shift logic is not provided for the High/Low shift lever 92. When this lever is shifted the powershift gear selection remains unchanged so that a shift of eight gears is effected with each shift of the lever. However, as explained in copending application H, range shift logic may be provided for both the 4/5 shift lever and the High/Low shift lever.

The advantage of the change of mind logic may be appreciated by considering the following example. Assume that the transmission is in gear 8L, that is, the High/Low shift lever is in the low range, the 4/5 lever is in the 5 range, and powershift gear 4 is in effect. A shift of the 4/5 lever to the 4 range results in selection of gear 4L since the range shift logic selects the highest powershift gear when the 4/5 shift lever is shifted to the 4 range. Now, if the 4/5 shift lever is 0 shifted back to the 5 range, the transmission is placed not in original gear 8L but instead enters gear 5L since the range shift logic selects powershift gear 1 when the 4/5 shift lever is shifted to the 5 range. Therefore, if an operator should shift the 4/5 shift lever from the 5 to the 4 range and then decide, before he releases the clutch pedal, that he wants to go back to the previous gear, the shift back to the 5 range results in a sudden unexpected change in speed. The change of mind logic prevents this by saving the powershift gear value in effect at the time the clutch pedal was last released, and if, while the clutch pedal is depressed, the 4/5 select lever is shifted and then returned to its previous position before the clutch pedal is released to or above the threshold point PCLUTCH THR, the saved powershift gear value is used.

In FIG. 8, if a shift from the 4 to 5 range is detected at step 800, the value OLD RANGE is tested at step 802 to see if it is equal to range 5. OLD RANGE is always reset to zero when the clutch pedal is released so during the first execution of the Range Shift routine after the pedal is depressed the test at step 802 proves false. At step 803 location OLD PS GEAR is set to the value in POWERSHIFT GEAR, POWERSHIFT GEAR is set to 1 and OLD RANGE is set to 4. An exit is made to the Creeper routine.

The next time (or times) the Range Shift routine is executed, and assuming no further shifting of the 4/5 shift lever only steps 805, 800 and 801 are executed and all tests prove false so nothing happens. If the operator releases the clutch pedal, as in a normal shift, the release of the clutch pedal is detected at step 805, OLD RANGE is reset at step 806 and the driveline is engaged in the new gear (5L) at step 504. On the other hand, if the operator should change his mind and move the 4/5 shift lever back to the 4 range before releasing the clutch, this second shift is detected at step 801. At step 807 OLD RANGE is tested to see if it is equal to 4. This value was set in OLD RANGE at step 803 so the test proves true and the routine branches to step 804 where OLD PS GEAR, the powershift gear value at the time of the clutch depression, is transferred to POWERSHIFT GEAR. Therefore, when the clutch pedal is released the same powershift gear that was in effect before the shift becomes the selected powershift gear.

A shift from the 5 to 4 range is accomplished in a similar manner, the primary difference being that OLD RANGE is set to 5 and POWERSHIFT GEAR is set to 4 at step 808.

The Creeper routine controls energization of the creeper solenoid 83 which controls engagement of the creeper gear 54. Actuation of the creeper switch contacts 170 is required to engage or disengage the creeper gear but the High/Low shift lever 92 must be positioned to select the low range and the clutch pedal must be depressed when the creeper switch is actuated.

At step 900 a test is made to see if the High/Low shift lever is set for the low range. If it is, the creeper switch contacts 170 are tested at step 901 and compared with the last sampling of the switch contacts to see if there has been a transition. If the creeper switch has been actuated, the output of the clutch pedal potentiometer 79 is tested at step 903 and if the clutch pedal is not depressed the creeper solenoid state remains unchanged and the program moves to step 906.

If the test at step 903 shows that the clutch pedal is depressed, a test is made at step 904 to see if the creeper solenoid is on or off. The test may be made by sampling a flag which is set when the creeper solenoid is turned on or reset when the solenoid is turned off. If the solenoid has been energized the program branches to step 902 to turn it off but if the solenoid has not been energized the program branches to step 905 to turn it on. Referring to FIG. 3, the creeper solenoid 83 is energized by turning on a transistor 181 so that a circuit is established from +12V through solenoid 83 and a resistor 184 to ground. The resistor is connected across the inputs of an amplifier 182. The output of aplifier 182 is tied to one of the A/D input channels of microprocessor 80. When solenoid 83 is energized, the output of amplifier 182 increases to some value determined by the magnitude of the current through the creeper solenoid and resistor 184. The analog output of amplifier 182 is digitized and compared with threshold values by means not shown to detect shorts, opens or out of range current in the creeper solenoid circuit.

A so-called "normal" start-up was described above wherein the ignition key is turned on while the tractor is stationary. Provision is also made for a "rolling reset" start-up. This might occur, for example, as a result of an intermittent or temporary power loss, transient electrical noise, engine stall or even the turning of the ignition key off and then on while the tractor is moving. In these situations it is desirable to re-engage the driveline in the same powershift gear that was in effect prior to the reset provided the positions of the 4/5 and High/Low shift levers have not changed. This eliminates unexpected gear and speed changes while the tractor is moving if the microprocessor is reset. It also allows a smooth recovery when a fault occurs because, without the provision for a rolling reset the automatic powershift gear selection made by the Initial Gear routine during normal start-ups would be in effect. The routine of FIG. 4B controls the rolling reset start-up as explained in above-referenced application G-2 and reference may be made to that application for a detailed description of the routine.

From the foregoing description it is seen that the present invention provides controls for insuring that the gear speed ratio selected during a normal start-up is limited to the narrowest range possible given that the range select levers may have various conditions. The invention also insures that after a microprocessor reset the transmission is returned to the same gear as before reset if the shift levers have not been moved. Finally, the invention permits an operator to change his mind and shift back to a selected gear automatically if the range shift lever is shifted back to its original position before the clutch pedal is released.

While a preferred embodiment of the invention has been described in detail, it will be understood that various modifications and substitutions may be made in the described embodiment without departing from the spirit and scope of the invention as defined by the appended claims. The principles of the invention are applicable to different transmissions having different numbers of selectable gear speeds and more or less than two range shift levers. It is intended therefore to be limited only by the scope of the appended claims.

The invention in which an exclusive property or privilege is claimed is defined as follows.

We claim:

1. In a transmission having at least a first coupler responsive to movement of a range select lever between first and second positions for selecting a first or a second range of gears and a microprocessor responsive to actuation of powershift switches for controlling a plurality of electro-hydraulic powershift clutches to thereby select one of a plurality of powershift gears within the selected first or second range, a method of selecting an initial gear at start-up, said method comprising:
   sensing the position of said range select lever;
   sensing for a sequence of start-up conditions; and,
   when said sequence of start-up conditions exists, energizing said powershift clutches to select the lowest powershift gear if said range select lever is in said second position and energizing said powershift clutches to select the highest powershift gear if said range select lever is in said first position.

2. The method as claimed in claim 1 wherein the step of sensing for a sequence of start-up conditions comprises sensing that an engine which drives the transmission is running and sensing that a clutch pedal transition has been made from a depressed position to a released position.

3. The method as claimed in claim 1 wherein the step of sensing for a sequence of start-up conditions comprises sensing that an engine which drives the transmission is running and sensing that a forward/reverse lever transition has been made from neutral to not netural.

4. A method as claimed in claim 1 for controlling a transmission having a second coupler responsive to movement of a second range select lever between first and second positions for selecting a range of gears within either said first or second range, said method further comprising:
   sensing the position of the second range select lever;
   when said sequence of start-up conditions exists, energizing said powershift clutches to select said highest powershift gear if said range select lever and said second range select lever are both in their respective first positions and energizing said powershift clutches to select said lowest powershift gear when said levers are in any other combination of positions.

5. A method as claimed in claim 4 where said range select lever and said second range select lever both have a neutral position and the step of energizing said powershift clutches is carried out only if neither said range select lever or said second range select lever is in its neutral position.

6. The method as claimed in claim 4 wherein the step of sensing for a sequence of start-up conditions comprises sensing that an engine which drives the transmission is running and sensing that a clutch pedal transition has been made from a depressed position to a released position.

7. The method as claimed in claim 4 wherein the step of sensing for a sequence of start-up conditions comprises sensing that an engine which drives the transmission is running and sensing that a forward/reverse lever transition has been made from neutral to not neutral.

8. In a transmission having at least a first coupler responsive to movement of a range select lever between first and second positions for selecting a first low or a second high range of gears and a microprocessor responsive to actuation of powershift switches for controlling a plurality of electro-hydraulic powershift clutches to thereby select one of a plurality of powershift gears within the selected first or second range, apparatus for selecting an initial gear at start-up, said apparatus comprising:
   first means for sensing the position of range select lever;
   second means for sensing for a sequence of start-up conditions; and,
   third means responsive to said first and second means and operative when said sequence of start-up conditions exists for controlling said powershift clutches to select the lowest powershift gear if the range select lever is in said second position and controlling said powershift clutches to select the highest powershift gear if said range select lever is in said first position.

9. Apparatus as claimed in claim 8 wherein the second means comprises means sensing that an engine which drives the transmission is running and means sensing that a clutch pedal has made a transition from a depressed position to a released position.

10. Apparatus as claimed in claim 8 wherein the second means comprises means sensing that an engine which drives the transmission is running and means sensing that a forward/reverse lever transition has been made from neutral to not neutral.

11. Apparatus as claimed in claim 8 for controlling a transmission having a second coupler responsive to movement of a second range select lever between first and second positions for selecting a lower or a higher range of gears, said apparatus further comprising:

fourth means for sensing the position of the second range select lever;

said third being responsive to said first, second and fourth means for controlling said powershift clutches to select said highest powershift gear if said range select lever and said second range select lever are both in their respective first positions and controlling said powershift clutches to select said lowest powershift gear when said levers are in any other combination of positions.

12. In a transmission having at least a first coupler responsive to movement of a range select lever between first and second positions for selecting a first or a second range of gears, a further coupler responsive to movement of a forward/reverse control lever for selecting forward or reverse drive of an output shaft of said transmission, and a microprocessor responsive to manually actuated powershift switches for controlling a plurality of electro-hydraulic powershift clutches to thereby select one of a plurality of powershift gears within the selected first or second range, a method of selecting an initial gear at start-up, said method comprising:

sensing the position of said range select lever;

determining if a sequence of start-up conditions has occurred;

when said sequence of start-up conditions occurs, energizing said powershift clutches to select the lowest powershift gear if said range select lever is in said second position and energizing said powershift clutches to select the highest powershift gear if said range select lever is in said first position; and, driving said output shaft in a forward direction at the selected powershift gear when said forward/reverse lever selects forward drive and driving said output shaft in the reverse direction when said forward/reverse lever selects reverse drive.

13. The method as claimed in claim 12 wherein the steps of determining if said sequence of start-up conditions has occurred comprises sensing that an engine which drives the transmission is running and sensing that a clutch pedal transition has been made from a depressed position to a released position.

14. The method as claimed in claim 12 wherein the step of determining if said sequence of start-up conditions has occurred comprises sensing that an engine which drives the transmission is running and sensing that a forward/reverse control lever transition has been made from neutral to not neutral.

15. A method as claimed in claim 12 wherein said transmission includes a third coupler responsive to movement of a second range select lever between first and second positions for selecting a range of gears within either said first or second range, said method further comprising:

sensing the position of the second range select lever;

when said sequence of start-up conditions occurs, energizing said powershift clutches to select said highest powershift gear if said range select lever and said second range select lever are both in their respective first positions and energizing said powershift clutches to select said lowest powershift gear when said range select levers are in any other combination of positions.

16. A method as claimed in claim 15 where said range select lever and said second range select lever both have a neutral position and the step of energizing said powershift clutches is carried out only if neither said range select lever or said second range select lever is in its neutral position.

17. The method as claimed in claim 15 wherein the step of determining if said sequence of start-up conditions has occurred comprising sensing that an engine which drives the transmission is running and sensing that a clutch pedal transition has been made from a depressed position to a released position.

18. The method as claimed in claim 15 wherein the step of determining if said sequence of start-up conditions has occurred comprises sensing that an engine which drives the transmission is running and sensing that a transition of said forward/reverse lever has been made from neutral to not neutral.

* * * * *